United States Patent
Ding et al.

(10) Patent No.: US 11,516,213 B2
(45) Date of Patent: Nov. 29, 2022

(54) AUTHENTICATION FOR REQUESTS FROM THIRD-PARTY INTERFACES

(71) Applicant: MicroStrategy Incorporated, Vienna, VA (US)

(72) Inventors: Feng Ding, McLean, VA (US); Christophe Touret, McLean, VA (US); Jiao Xu, Oakton, VA (US)

(73) Assignee: MicroStrategy Incorporated, Vienna, VA (US)

( * ) Notice: Subject to any disclaimer, the term of this patent is extended or adjusted under 35 U.S.C. 154(b) by 251 days.

(21) Appl. No.: 17/025,276

(22) Filed: Sep. 18, 2020

(65) Prior Publication Data

US 2021/0084032 A1 Mar. 18, 2021

Related U.S. Application Data

(60) Provisional application No. 62/901,933, filed on Sep. 18, 2019.

(51) Int. Cl.
*G06F 3/00* (2006.01)
*H04L 9/40* (2022.01)
*G06F 9/54* (2006.01)

(52) U.S. Cl.
CPC ............ *H04L 63/0853* (2013.01); *G06F 9/54* (2013.01); *H04L 63/102* (2013.01)

(58) Field of Classification Search
CPC ................................ G06F 9/54; H04L 63/0853
See application file for complete search history.

(56) References Cited

U.S. PATENT DOCUMENTS

| 7,219,154 B2 | 5/2007 | Blakley, III et al. |
| 7,401,235 B2 | 7/2008 | Mowers et al. |
| 8,042,162 B2 | 10/2011 | Blakley, III et al. |

(Continued)

FOREIGN PATENT DOCUMENTS

CA 2843292 A1 * 8/2014 ............. G06F 21/43

OTHER PUBLICATIONS

Prashant Gupta, IQS—Intelligent Querying System using Natural Language Processing (Year: 2017).*

(Continued)

*Primary Examiner* — Lechi Truong
(74) *Attorney, Agent, or Firm* — Fish & Richardson P.C.

(57) ABSTRACT

Methods, systems, and apparatus, including computer-readable media, for authentication requests from third party interfaces. In some implementations, an information request is received to an information system from a computing system that provides a natural language interface, wherein the information request is associated with a user, and (ii) a token corresponding to the information request. In response to receiving the information request, a user data request and the token corresponding to the information request are sent for requesting user profile information for the user associated with the information request. A user identifier is extracted from user profile information received from the trusted profile provider system. A user identity is identified for the user based on a match between the extracted user identifier and a user identifier in a user registry associated with the information system. The information request is processed based on the identified user identity.

18 Claims, 3 Drawing Sheets

(56) References Cited

U.S. PATENT DOCUMENTS

| | | | |
|---|---|---|---|
| 8,291,468 B1 | 10/2012 | Chickering | |
| 8,397,280 B1* | 3/2013 | Zhu | H04W 12/069 |
| | | | 726/4 |
| RE45,327 E | 1/2015 | Bowers et al. | |
| 10,200,368 B2 | 2/2019 | Oberheide et al. | |
| 10,268,815 B2 | 4/2019 | Dunstan | |
| 2003/0163739 A1 | 8/2003 | Armington et al. | |
| 2021/0105264 A1* | 4/2021 | Patel | H04L 9/3228 |

OTHER PUBLICATIONS auth0.com [online], "Interaction-Based Authentication for Alexa Skills with Auth0," Apr. 27, 2017, retrieved on Mar. 18, 2021, retrieved from URL <https://auth0.com/blog/interaction-based-auth-for-alexa-with-auth0/>, 35 pages.

developers.onelogin.com [online], "Authenticating Alexa Skills With OneLogin," Dec. 7, 2020, retrieved on Mar. 26, 2021, refrieved from URL <https://developers.onelogin.com/authentication/tools/alexa>, 10 pages.

developers.onelogin.com [online], "Connect an OIDC enabled app," Apr. 20, 2018, retrieved on Mar. 26, 2021, retrieved from URL <https://developers.onelogin.com/openid-connect/connect-to-onelogin>, 5 pages.

tools.ietf.org [online], "JSON Web Token (JWT)" May 2015, retrieved on Mar. 26, 2021, retrieved from URL <https://tools.ietf.org/'html/rfc7519>, 31 pages.

tools.ietf.org [online], "OAuth 2.0 Token Introspection," Oct. 2015, retrieved on Mar. 26, 2021, retrieved from URL <ttps://tools.ietf.org/html/rfc7662>, 18 pages.

tools.ietf.org [online], "The OAuth 2.0 Authorization Framework," Oct. 2012, retrieved on Mar. 26, 2021, retrieved from URL <https://tools.ietf.org/html/rfc6749>, 77 pages.

tools.ietf.org [online], "Third-Party Token-based Authentication and Authorization for Session Initiation Protocol (SIP)" Nov. 19, 2019, retrieved on Mar. 26, 2021, retrieved from URL <https://tools.ietf.org/id/draft-ietf-sipcore-sip-token-authnz-06.html>, 16 pages.

* cited by examiner

AUTHENTICATION FOR REQUESTS FROM THIRD-PARTY INTERFACES

CROSS-REFERENCE TO RELATED APPLICATION

This application claims the benefit of U.S. Provisional Application No. 62/901,933, filed Sep. 18, 2019, and titled "AUTHENTICATION FOR REQUESTS FROM THIRD-PARTY INTERFACES," which is incorporated by reference.

BACKGROUND

This specification relates generally to authentication, and more particularly to authentication for requests received through third-party interfaces.

Authentication processes are used in many systems, including network security systems, financial systems, and health systems. For example, to access sensitive data, users often must present login credentials and be authenticated to access the sensitive data.

SUMMARY

In some implementations, a system provides an authentication technique that can authenticate a user seeking to access a secure system through one or more third-party interfaces. The system can verify that user profile data from a trusted source matches data from a user profile for the secure system, and then authenticate the user based on the match. For example, a user may interact with a first system, which stores a first user profile that includes verified information about the user. The first system may communicate with a second system to fulfill a request that the user submitted using the first system. For the second system to identify and authenticate the user, the second system may request that the first system provide user profile data for the user. The second system can then compare the received user profile data with user profiles for users of the second system. A match between the received user profile data and a user profile of the second system indicates the identity of the user. Because the second system trusts the first system and the profile data from the first system, the second system can authenticate the user in the second system based on the matching data in the profiles. In this manner, the second system can authenticate the user without requiring the user to provide credentials for the second system.

As discussed further below, the authentication techniques discussed in this application can allow a secure system to authenticate users that submit requests through any of multiple third-party interfaces. The authentication can be done without requiring the user to enter authentication credentials for the secure system. Once the user authenticates to a third-party interface, that authentication can be transferred or translated into authentication in the secure system (e.g., a different domain or different system), even when the third-party interface uses an authentication scheme that is incompatible with the authentication scheme of the secure system. For example, a third-party interface may provide a security token that the secure system cannot verify or read. Nevertheless, by matching profile data associated with the third-party interface and profile data of the secure system, the secure system can still identify the user and authenticate the user based on the trust in the data from the third-party interface.

As an example, an analytics system may be configured to receive and respond to queries made through many different third-party interfaces, each of which may have their own authentication systems and user profile databases. For example, the third-party interfaces may include web pages, web applications, mobile device applications, social media platforms, chat platforms, messaging platforms, voice response systems, digital conversational assistants, and so on. Once a user has authenticated to one of these third-party interfaces, the interface may forward the user's query to the analytics system along with an authorization token representing an authenticated session with the third-party interface. The analytics system, however, may not configured to verify or otherwise use the authorization token from the third-party interface. As a result, the analytics system uses a parallel authentication process to extend the authentication to the third-party interface to provide authentication in the analytics system. The analytics system requests profile information corresponding to the authorization token from a trusted profile data provider, and receives profile data for the user in response (e.g., an e-mail address, a phone number, a name, an address, etc.). The analytics system looks for a match between one or more items in the received profile data and user profiles for users of the analytics system. The analytics system can select and compare a specific type of value, such as a value in a specific field (e.g., specifically comparing values in e-mail address fields of the two user profiles). When the analytics system finds a match, the analytics system creates a new authenticated session for the user whose profile is determined to include data matching the received profile data. In some implementations, the analytics system creates the new authenticated session and provides access using the user's account without requesting or receiving any credential information of the user. In other implementations, the analytics system may initiate a communication to the user, through the third-party interface or through another interface (e.g., a message to a mobile device application, a push notification, etc.) requesting the user to enter his credentials for verification or to confirm authorization of use of the account before access is granted.

Once an authenticated session is created for the user in the analytics system, the analytics system can provide data to the third-party interface to answer the user's query or other request. The analytics system can store data that associates the third-party token from the third-party interface with the authenticated session at the analytics system. When the analytics system receives subsequent requests in connection with the third-party token, the analytics system can generate responses using the existing authenticated session that has been mapped to that third-party token. The system can then bypass the profile matching while the authenticated session is still active, because the identity and authentication of the user corresponding to the third-party token have already been established.

In some implementations, the secure system includes multiple components that cooperate to provide authentication and respond to requests. For example, the secure system may include an authentication front end, a web server, and an application server. The authentication front end examines received requests and tokens, requests and receives user profile data, and extracts user identifiers (e.g., e-mail addresses, phone numbers, etc.) from the user profile data. The authentication front end generates an encrypted token by encrypting an extracted user identifier along with data from the request from the third-party interface. The authentication front end provides the encrypted token to the web server, which compares the user identifier with user profiles.

When the web server determines that the user identifier matches a user identifier in a particular user profile of the secure system, then the web server deems the corresponding user to be authenticated. The web server opens a session for this identified user with the application server. The session provides a pathway for the third-party interface to communicate with and retrieve data from the application server on behalf of the user. The application server can then provide data, in response to a user request, that is passed to the third-party interface, through the web server, for presentation to the user. The authentication front end can temporarily cache or store data associating the token from the third-party interface with the session for the secure system. As a result, for subsequent requests from the user through the third-party interface, the authentication front end can bypass the profile matching steps and provide the user's subsequent request to the application server with the open session for the user. The application server can retrieve data based on the request and the authentication token and return the retrieved data for presentation to the user through the third-party interface.

In a general aspect, a method includes: receiving, by the one or more computers, (i) an information request to an information system from a computing system that provides a natural language interface, wherein the information request is associated with a user, and (ii) a token associated with the information request; in response to receiving the information request, sending, by the one or more computers, (i) the token associated with the information request and (ii) a user data request for information from a user profile for the user; extracting, by the one or more computers, a user identifier from user profile information received in response to the user data request; identifying, by the one or more computers, a user identity for the user based on a match between the extracted user identifier and a user identifier in a user registry associated with the information system; and processing, by the one or more computers, the information request based on the identified user identity.

Other embodiments of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations: the token associated with the information request corresponds to a first authentication protocol; and wherein identifying the user identity for the user based on the match between the extracted user identifier and the user identifier in the user registry includes: based on the match between the extracted user identifier and the user identifier in the user registry, generating, by the one or more computers, a second token that corresponds to an authentication protocol that is different from the first authentication protocol.

In some implementations, the method includes determining that the token associated with the information request is not of a type used by the information system; wherein the user data request is sent based on determining that the token associated with the information request is not of a type used by the information system.

In some implementations, the information request is from a system providing a natural language interface, and wherein the information request comprises a natural language query.

In some implementations, the information request includes (i) text of a spoken request entered through a voice interface, (ii) text entered from a messaging platform, (iii) text entered using a social networking platform, or (iv) text entered using a chat platform.

In some implementations, the method includes selecting a trusted profile provider system from among multiple trusted profile provider systems based on a source of the information request, wherein the selecting comprises using data indicating a mapping of sources of requests to the multiple trusted profile provider systems to select one of the multiple trusted profile provider systems that corresponds to the source of the information request.

In some implementations, the method includes accessing mapping data indicating a mapping of different types of user identifiers to different trusted profile provider systems; and selecting, based on the mapping data, one of the different types of user identifiers to extract from the user profile information received from the trusted profile provider system.

In some implementations, a trusted profile provider system is a predetermined provider known to verify an accuracy of at least a user identifier in the user profile information.

In some implementations, the one or more computers are configured to interface between the information system and multiple different natural language interfaces operated by different third parties and to identify and authenticate users even if the multiple different natural language interfaces do not provide authentication tokens recognized by the information system.

In some implementations, wherein processing the information request based on the identified user identify further includes: in response to identifying the user identity, generating, by the one or more computers, one or more sessions between a web server and the computing system to provide the user access to the web server over the one or more sessions.

In some implementations, the method includes providing, by the one or more computers, responses to the information request from the information system over the one or more sessions, wherein the responses have been personalized based on the identified user identity.

In some implementations, the information request is provided through an application programming interface (API) provided by a trusted profile provider system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
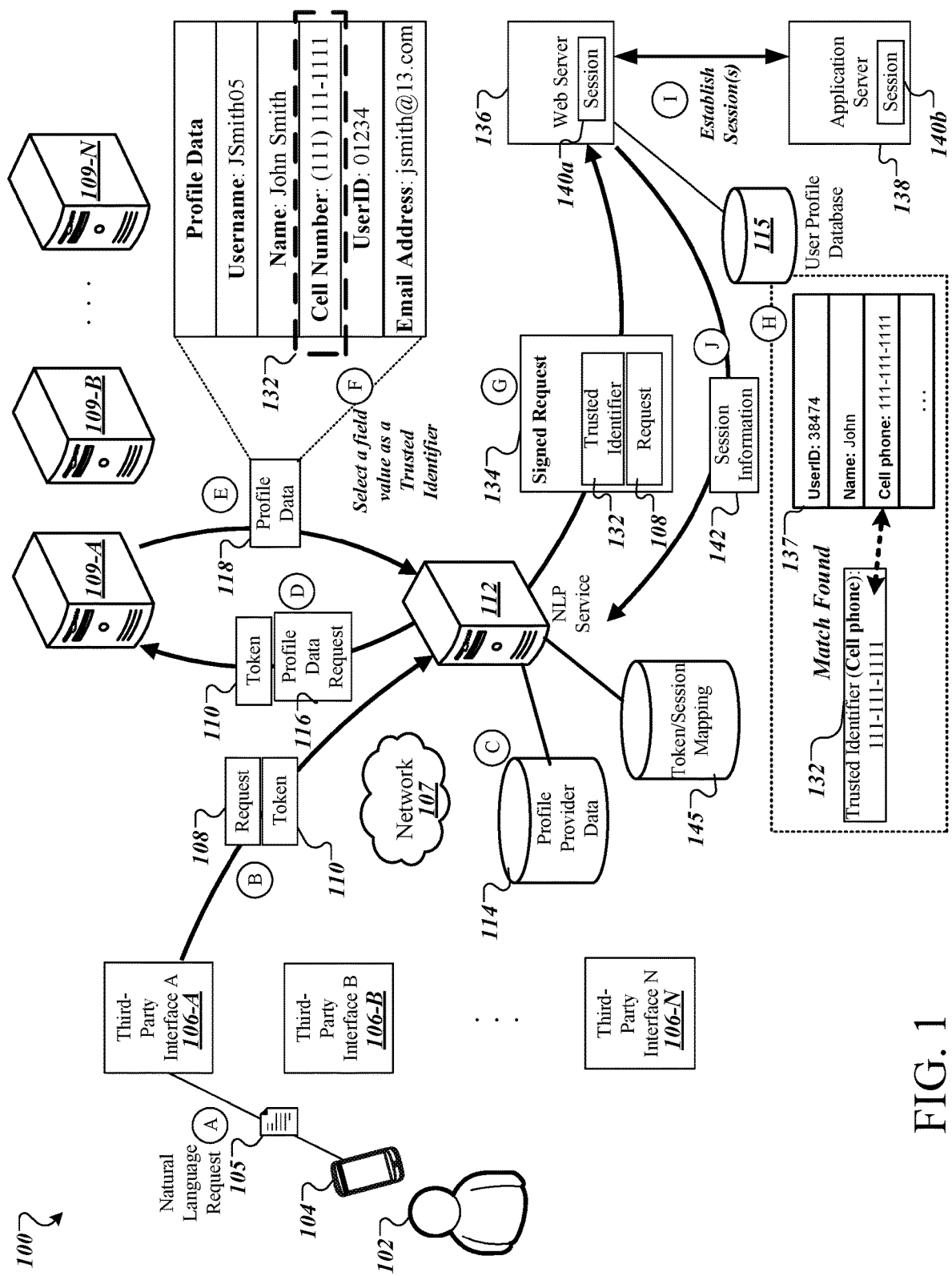
FIG. 1 is a block diagram that illustrates an example of a system for authenticating a user at a third-party interface to access a secure system.

FIG. 1 is a block diagram that illustrates an example of a system 100 for authenticating a user at a third-party interface to access a secure system. In the system 100, the secure system includes a natural language processing (NLP) service 112, a web server 136, and an application server 138. In some implementations, these components may be operated and managed by a single party or organization, for example, as part of an analytics platform. For example, the secure system may be a business intelligence system configured to provide responses to queries, management of documents, generation of content (e.g., reports, visualizations, dashboards, etc.), online analytical processing (OLAP), database services, and so on.

In the system 100, the NLP service 112 serves as an intermediary that allows any of multiple third-party interfaces to request and receive information from the web server 136 and the application server 138. For example, the NLP service can serve as a front end that facilitates the acceptance and processing of natural language requests and/or other types of requests from any of multiple third-party interfaces. The NLP service 112 receives incoming requests and verifies that requests have appropriate information to be authenticated for the web server 136 and application server 138. When additional information is needed to identify and authenticate a user corresponding to a request, the NLP service 112 obtains that data. Then the NLP service 112 provides the request from the third-party interface, along with additional data needed for authentication, to the web server 136 in a format that is acceptable to the web server 136. Thus, the NLP service 112 can translate requests and authentication data from different third-party interfaces into a format that is accepted by the web server 136 and/or application server 138.

The system 100 also includes a client device 104, various third-party interfaces 106-A to 106-N, various trusted profile provider systems 109-A to 109-N, and a network 107. The secure system (e.g., elements 112, 136, and 138) may be configured to receive and respond to requests from any of the third-party interfaces 106-A to 106-N, even though the interfaces may be operated independently from the secure system, and with different user accounts and authentication systems. As discussed further below, the NLP service 112 can act as an intermediary to translate requests from the third-party interfaces 106-A to 106-N into data packages that can enable authenticated sessions to be automatically generated, often without requiring any challenge or verification of credentials of the user whose actions caused the requests. Although, in some implementations, verification and confirmation of a requesting user's credentials can be validated.

The example of FIG. 1 shows the user 102 interacting with the third-party interface A 106-A in a manner that obtains content from the application server 138. The user 102 can additionally or alternatively interact with third-party interface B 106-B or third-party interface N 106-N using the client device 104, or with another client device, to access the NLP service 112. Similarly, although only one user 102 is illustrated, the system is capable of supporting many users concurrently using many different third-party interfaces and client devices. FIG. 1 illustrates various operations in stages (A) through (I), which show a flow of data can be performed in the sequence indicated or in another sequence.

In general, the system 100 illustrates a user 102 interacting with a third-party interface, e.g., one of third-party interfaces 106-A through 106-N, that is operated independently from the secure system (e.g., elements 112, 114, 136, and 138). The third-party interfaces 106-A through 106-N can provide the user 102 a natural language interface, for example, for entry of natural language queries, text-based chat or messaging, natural language voice input and voice response, and so on. In the course of interacting with one of the natural language interfaces, the user 102 enters a request (e.g., a query or command) that the third-party interface determines to require information from the secure system. For example, the user 102 may speak a voice query that requests information about performance of a company.

A voice interface, such as AMAZON ALEXA, may receive the query and the ALEXA device, ALEXA skill, or an associated server may determine that requested information should be obtained from a business analytics platform that provides the requested information. In some examples, the secure system can be registered with each of the various third-party interfaces 106-A through 106-N so that these interfaces can determine when to direct requests to the secure system and how to format the requests. In some examples, the secure system can generate an application to install within each of the third party interfaces 106. The application can communicate with the secure system. For example, the application can include an ALEXA skill. In some third party interfaces 106, such as third party interface 106-N, the secure system can provide a bot user, which enables the secure system to be embodied as a user in the third party interface 106-N. For example, if the third party interface 106-N include SLACK, the secure system can install a bot user in SLACK such that users can communicate with and obtain data from the secure system. This registration process may be done on a user-by-user basis in some implementations. For example, the user 102 may previously have associated or designated the secure system as an information provider for his account with the third-party interfaces 106-A. In other implementations, the registration process can include an installment and a deployment of an application onto a particular third party interface.

In some cases, the user 102 can directly access the NLP service 112 by directly interacting with an interface of the NLP service 112. In this example, the user would provide his or her login credentials to be authenticated with the NLP service 112 and access secured or sensitive data associated with the NLP service 112. However, as shown in the example of FIG. 1, the user 102 seeks to access information through a third-party interface, such as third-party interface A 106-A.

The client device 104 can enable the user 102 to use any of various third-party interfaces to carry out natural language interactions. For example, the third-party interfaces can include FACEBOOK MESSENGER, SLACK, ALEXA, GOOGLE HOME, a chat interface, a messaging (e.g., short message service (SMS)) interface, a web page, a web application, a mobile device application, and other natural language interfaces. The user 102 can select and open a third-party interface to launch (e.g., as an application) on the client device 104.

Before a user 102 can access a third-party interface, the user 102 generally must set up a profile with each of the corresponding third-party interfaces. A user's profile associated with a third-party interface stores data related to a user's access with the third-party interface. For example, user 102's profile associated with third-party interface A 106-A stores login credentials of user 102, e.g., username and password, a personal identification number (PIN), an email address, a cell phone number, a name, a user identifier, and a device identifier. The user 102 can change the data or fields in the profile associated with a third-party interface upon user request. For example, user 102 can change his email address, password, or cell phone number in his profile. Generally, a user may have a different user account, and thus different user profile, for each of the third-party interfaces 106-A to 106-N.

The various third-party interfaces may take steps to verify the validity of the information that users provide for their profiles. For example, when a user changes his cell phone number in a profile, a third-party interface may send a text message with a verification code to the new cell phone number and require the user to submit the code to provide that the phone number is correct. Similarly, a third-party interface may send an email message to a user's stated email address and require an interaction (e.g., providing a code, clicking a provided hyperlink, etc.) to prove that the user has control of the email account. Third-party interfaces 106-A to 106-N that take appropriate verification steps to maintain accurate profile data can be trusted by the secure system for authentication purposes, as discussed further below.

Each third-party interface 106-A through 106-N can create and store separate sets of profiles for their respective users. For example, the user 102 may have a different user account and user profile for each of the third-party interfaces 106-A through 106-N. The various third-party interfaces 106-A through 106-N can each make their user profile data available to other systems, for example, through an application programming interface (API). This is illustrated by the trusted profile provider systems 109-A to 109-N. For example, the trusted profile provider system 109-A is configured to provide user profile data for the profiles used by the third-party interface 106-A.

Once the profile of a user 102 has been generated, the third-party interface associates activity of the user 102 with the user's profile each time the user 102 logins to the third-party interface with his/her credentials. For example, the user 102 logins to third-party interface A 106-A using his username and password. The third-party interface A 106-A can accept or deny the user's login credentials based on a match to stored credentials found in the corresponding user profile. If the third-party interface A 106-A accepts the user's login credentials, the third-party interface A 106-A initiates a session for the user 102 and may personalize presentation of the third-party interface A 106-A (e.g., audibly, visually, or both) on client device 104 based on the user 102's corresponding profile.

When a user is authenticated to a third-party interface, the third-party interface generates a secure token, such as an authorization token or session token, that corresponds to the user's account. This token can change from time to time, and so generally cannot be relied on to have long-term validity. For example, the token for a user may change hourly, daily, each time the user logs in, etc. The token for a third-party interface in many instances is encrypted and cannot be decrypted or validated by other systems, such as the NLP service 112, the web server 136, and the application server 138. Nevertheless, the presentation of the token may demonstrate authorization to access certain data associated with a user or session of the user. For example, the token may be forward to the appropriate profile provider system in order to demonstrate authorization to receive profile data for the user corresponding to the token.

The secure system also maintains user profiles for its users, separate from the user profiles used by the third-party interfaces. These profiles can be stored in a user profile database 115. For example, the user 102 must have a profile associated with the secure system in order to login and access any of the components associated with the secure system. The profile associated with the secure system can include various fields, such as, for example, a username, a password, a name, a user identifier, an email address, a cell phone number, and a device identifier. Each user profile within the database 115 can be indexed for fast retrieval by various different user identifiers (e.g., cell phone number, email address, username, etc.) Indexing provides a quick and effective way to match credentials provided by user 102 when logging in to the secure system via the NLP service 112.

The NLP service 112 provides an API for the various natural language interfaces of third parties to communicate with the secure system. In some examples, the NLP service 112 receives a request from a third-party interface seeking to access the secure system. The NLP service 112 also obtains the information needed to authenticate users for requests received from the third-party interfaces. For example, the NLP service 112 can receive a request from any of the third-party interfaces, retrieve user profile data from one of the trusted profile provider systems 109-A to 109-N, and communicate appropriate information with the web server 136 and/or the application server 138 so that the request can be processed. In some implementations, the NLP service 112 can encrypt or sign data when communicating with the web server 136 and the application server 138.

Although the secure system may not be able to validate tokens from the third-party interfaces, the NLP service 112 can still use different types of tokens in communicating with the trusted profile provider systems 109-A to 109-N. Third-party interfaces may use different authentication protocols. For example, third-party interface A 106-A may use using Security Association Markup Language (SAML); third-party interface B 106-B may communicate using OAuth 2.0; and third-party interface C 106-N may communicate using JSON Web Tokens (JWT). The NLP service 112 can be configured to communicate with each of these authentication protocols.

In some implementations, the application server 138 can include one or more servers connected over a network. In some implementations, the application server 138 can receive a request to open one or more sessions from the web server 136. As previously mentioned, the one or more sessions allow users to request for data from the application server 138. The one or more sessions can be opened at the application server 138 in response to authenticating the user 102 communicating through a third-party interface with the secure system. The one or more sessions at the application server 138 allow subsequent requests sent by an authenticated third-party interface to retrieve data from the application server 138.

In some implementations, the authentication technique described in system 100 provides user flexibility to access data from the secure system (e.g., from the application server 138) from any of multiple different platforms. For example, the user 102 may submit a query to a digital conversational assistant (e.g., AMAZON ALEXA, GOOGLE HOME, etc.) and receive a response based on information from the application server 138, without having to specifically authenticate for the application server 138. Similarly, the user 102 may submit a query to a chat or messaging platform that also obtains response data from the application server 138, without having to specifically authenticate for the application server 138.

The client device 104 can be, for example, a desktop computer, a laptop computer, a tablet computer, a wearable computer, a cellular phone, a smart phone, a music player, an e-book reader, a navigation system, a smart speaker, an appliance, a digital assistant device, or any other appropriate computing device. The network 107 can be wired or wireless or a combination of both, and can include the Internet.

In the example of FIG. 1, a user 102 submits a request to the third-party interface 106-A. The third-party interface 106-A then sends a request and token to the NLP service 112, to obtain information from the secure system to respond to the user's request. The NLP service 112 retrieves user profile data for the user 102 from a trusted profile provider system 109-A using the token. The NLP service 112 selects a user identifier from the received profile data and transmits the value and request to the web server 136. The web server 136 determines whether the user identifier matches an identifier in a user profile in the database 115, and if a match is found, the web server 136 creates an authenticated session for the user. The web server 136 and the application server 138 communicate through the NLP service 112 to provide data to the third party interface 106-A in response to receiving the request from the third-party interface 106-A. The third-party interface 106-A then provides the response to the user 102.

During stage (A), the user 102 provides a natural language request 105 to the third-party interface A 106-A. For example, the user 102 may submit a request using FACEBOOK MESSENGER, SLACK, or another chat application on the client device 104. As another example, the client device 104 may be a smart speaker or digital assistant device, such as an ALEXA device, that receives voice commands from the user 102. The user 102 can be logged-in to the third-party interface A 106-A, such that the user 102 is authenticated to the third-party interface A 106-A.

During stage (B), the third-party interface A 106-A determines that the request 105 calls for information from the secure system (e.g., the platform comprising the NLP service 112, the web server 136, and the application server 138). The user request 105 may specify that information should be obtained from the secure system, e.g., "Get a statement from the Analytics System." In other instances, the fact that information is needed from the analytics system can be inferred from the type of action requested or the nature of the request. For example, the query "generate a chart of quarterly performance" may be directed to the analytics system because of the type of action (e.g., generating a chart) or the subject matter (e.g., quarterly performance).

The third-party interface A 106-A sends a request 108 to the NLP service 112, which can include payload data specifying a query or otherwise indicating information requested from the secure system. The request 108 can be an information request to an information system, sent from a computing system (e.g., client device 104) that provides a natural language interface. The request 108 is accompanied by a token 110 corresponding to the authentication or session of the user 102 with the third-party interface 106-A. The token 110 can be a persistent token that can demonstrate authentication of the user 102 to the third-party interface 106-A and an associated profile provider system 109-A.

The third-party interface A 106-A communicates with the NLP service 112 using a particular protocol. For example, the third-party interface A 106-A transmits the request 108 and the token 110 using HTTP or HTTPS. Other authentication protocols could also be used. Each third-party interface shown in system 100 can communicate to the NLP service 112 using a particular protocol through which the NLP service 112 is configured to receive information.

During stage (C), the NLP service 112 evaluates the request 108 and the token 110 received over network 107. The NLP service 112 determines whether the token 110 is of a type that the web server 136 and/or application server 138 can validate and accept. If the token 110 can be accepted by the servers 136, 138, the NLP service 112 can forward the request 108 and token 110 on to the web server 136 for processing. In the example of FIG. 1, however, the NLP service 112 determines that the token 110 cannot be accepted by the servers 136, 138, and so additional authentication steps are needed to process the request 108. For example, the NLP service 112 may determine that the token 110 corresponds to an authentication protocol, for example, that the secure web server 136 does not support, or that a key needed to decrypt the token 110 is not available, or that the secure system does not have reference data needed to verify validity of the token 110, etc.

The NLP service 112 can also have access to token/session mapping data 145 that indicates mappings between third-party tokens and sessions used by the NLP service 112 or related systems. Although the web server 136 and/or application server 138 may not be able to use the token 110 directly 145 to determine if the token 110 is associated with an active session of the web server 136 and/or the application server 138, the NLP service 112 may check the token/session mapping data 145 to determine if the token is associated with an active session. If so, the NLP service 112 may forward the request with the session information, from the token/session mapping data 145, that corresponds to the token 110. If there is no session associated with the token 110, or if an associated session has expired or is invalid, then the NLP service 112 will perform further authentication.

When the NLP service 112 determines that the token 110 does not serve to authenticate the user 102 in the secure system, the NLP service 112 then initiates processing to extend the authentication of the user 102 in the third-party interface A 106-A to the secure system. This involves obtaining user profile information for the user 102 from a trusted profile provider. The NLP service 112 uses information from the request 108 to look up the appropriate trusted profile provider system 109-A to 109-N using information in the profile provider data 114. The profile provider data 114 can store a mapping between different sources of requests (e.g., different third-party interfaces 106-A to 106-N) and corresponding trusted profile provider systems 109-A to 109-N. Thus, using the content of the request 108 and the profile provider data 114, the NLP service 112 may determine that when a request is received from an ALEXA device, the NLP service 112 should request profile data from an ALEXA profile data API or server. Similarly, when the request 108 is from a social networking platform, the NLP service 112 identifies the trusted profile provider system for the social networking platform. The profile provider data 114 may provide information such as API specifications, server addresses, request requirements, and so on to allow the NLP service 112 to generate requests for any of the trusted profile provider systems 109-A to 109-N.

During stage (D), the NLP service 112 sends a profile data request 116 to the trusted profile data provider 109-A that the NLP service 112 selected as corresponding to the request 108. The profile data request 116 is accompanied by the token 110 received from the third-party interface 106-A. Even though the NLP service 112 may not be able to interpret or validate the token 110, the NLP service 112 can forward the token 110 as an indication that the NLP service 112 is authorized to obtain data corresponding to the user 102.

The trusted profile data provider 109-A, being associated with the third-party interface 106-A and using the same authentication system, can validate the token 110 and retrieve the appropriate profile data for the user 102 for the user's account with the third-party interface 106-A. The NLP service 112 providing the token 110 can demonstrate that the NLP service 112 is authorized to obtain information on behalf of the user 102. For example, the trusted profile data provider 109-A can verify the legitimacy of the received token 110 by generating a digital signature of the token 110 using a private key which is only known to trusted profile data provider 109-A. The trusted profile data provider 109-A then compares that digital signature to the signature included in token 110, and if a match exists, then the received token 110 is deemed legitimate. Once the token 110 is deemed legitimate, the trusted profile data provider 109-A can retrieve the appropriate profile data for the user 102.

During stage (E), the trusted profile data provider 109-A provides user profile data 118 for the user 102 to the NLP service 112 over the network 107. The profile data 118 includes personal information of the user 102 related to the third-party interface A 106-A. The personal information includes values for one or more fields that identify the user 102. For example, the one or more field values can include a username of the user 102, a name of the user 102, a cell phone number of the user 102, an email address for the user 102, etc.

During stage (F), the NLP service 112 selects a field value from the received profile data 118 to serve as a trusted identifier 132 for the user 102. The NLP service 112 may be configured to use different types of information (e.g., values from different profile fields) for authentication from different third-party interfaces 106-A to 106-N. For example, some third-party interfaces 106-A to 106-N may verify some user identifiers and not others. Thus, for one third-party interface 106-A, the NLP service 112 may be configured to use values from a cell phone number if the third-party interface 106-A verifies this data of its users. For a different third-party interface 106-B, the NLP service 112 may be configured to use values from an email address field instead, if the third-party interface 106-B has profiles that store verified email addresses. In some implementations, an administrator configures the NLP service 112 in advance to use values from a specific field type for a specific third-party interface 106-A. The administrator can select the field to be one that is a verified user identifier in user profiles for the third-party interface 106-A as well in user profiles of the secure system (e.g., the web server 136 and application server 138).

In the example of FIG. 1, the NLP service 112 has been configured to use values in a cell phone number field as the trusted identifiers for users submitting requests through the third-party interface 106-A. The NLP service 112 selects the cell phone number in the field, e.g., "111-111-1111", of the profile data 118 as the trusted identifier 132 for the user 102.

The trusted identifier can enable the user profile of the user 102 for the third-party interface 106-A and the user profile of the user 102 for the secure system to be linked (see stage (H) discussed below). When profiles in both systems have the same user identifier, and the user identifier is trusted or verified for both profiles, the match indicates that the two profiles represent the same user identity.

During stage (G), the NLP service 112 provides the trusted identifier 132 and the request 108 to the web server 136. The NLP service 112 can ensure security for communications with the web server 126 by signing or encrypting the trusted identifier 132 and the request 108. In some implementations, the signing and encryption of the trusted identifier 132 and the request 108 can be bypassed. In this implementations, the NLP server 112 and the web server 136 would reside in the same secure network. Alternatively, in this implementations, the NLP server 112 and the web server 136 can reside in the same server, e.g., such as the NLP server 112 or the web server 136.

In some implementations, the NLP service 112 includes in the signed request 134 data indicating the field from which the trusted identifier 132 was obtained. For example, the signed request 134 can include a field identifier, a field type identifier, or other data describing the field and/or data type represented by the trusted identifier 132. In the example, the trusted identifier 132 is taken from the cell phone number field of the user profile data 118, so the signed request 134 can specify that the trusted identifier 132 is from the cell phone number field. In general, the NLP service 112 maps the various fields of received profile data to a field in a user profile database 115 used by the web server 136. For example, the profile provider data 114 can include data that specifies, for various fields of profiles from different profile provider systems 109-A to 109-N, the corresponding field identifiers for profiles in the profile database 115. As a result, the NLP service 112 can identify and specify the appropriate field that the trusted identifier 132 corresponds to in the profile database 115.

In some implementations, the NLP service 112 packages the request 108 and the trusted identifier 132 (and potentially a field identifier and/or other data) as a signed JSON web token (JWT), and the JWT is provided as a signed request 134 (e.g., one including a cryptographic signature, certificate, etc.). The NLP service 112 then transmits the signed request 134 to the web server 136 over the network 107. The NLP service 112 can sign a JWT using a secret key that shared by the NLP service 112 and the web server 136. For example, the NLP service 112 signs the JWT with the shared secret key using an encryption algorithm, such as HS512 (e.g., a hash-based message authentication code (HMAC) algorithm using Secure Hash Algorithm 2 (SHA-2) with 512-bit digests or hashes). The web server 136 can later use its copy of the secret key to verify the authenticity of the content in the signed request 134. In some cases, the NLP service 112 provides the signed request 134 to the web server 136 through an application programmable interface (API) of the web server 136.

During stage (H), the web server 136 receives the signed request 134 from the NLP service 112 and looks for matches between the trusted identifier 132 and profiles in the profile database 115. The web server 136 verifies the signature of the signed request 134 using with a secret key that is the same as the one used to sign the request 134. After verifying the authenticity of the signed request 134, the web server 136 extracts the trusted identifier 132 from the signed request 134. The web server 136 also determines, using data in the signed request 134, which data type or field type the trusted identifier 132 represents.

The web server 136 determines whether the trusted identifier 132 matches any user profiles for the secure system, e.g., any profiles for authorized users of the web server 136 and application server 138. The web server 136 accesses a user profile database 115 that has profile data for its authorized users, who may or may not be currently authenticated to the web server 136 and application server 138. The web server 136 compares the trusted identifier 132 with profile data in the user profile database 115 for the same data type or field type as the trusted identifier. For example, the web server 136 may determine from the signed request 134 that the trusted identifier 132 represents a value from a cell phone number field, and so the web server 136 compares the trusted identifier 132 with values in cell phone number fields of profiles in the profile database 115. If the trusted identifier had been an email address, this would be specified in the signed request 134, and the web server 136 would compare the identifier with values in email address fields in the profiles of the user profile database 115. The web server 136 can identify matches of field values to profiles in a variety of ways, for example, by looking up the trusted identifier 132 in an index, comparing the trusted identifier 132 to field values of different profiles, querying for a match to the trusted identifier 132 in a database column representing the appropriate field, and so on. Matching the trusted identifier 132 to the value in a specific field can be important, because not all profile fields may be verified for accuracy. For example, a match between a phone number and text in a non-verified, free-form text portion of a profile would not reliably show that the profile corresponds to the person who has the phone number.

In the example, the web server 136 finds a match between the trusted identifier 132 and the cell phone number in a user profile 137 in the database 115. As a result, the web server 136 determines that the request 108 is a request made by or on behalf of the user described in the user profile 137. Because the third-party interface 106-A and the web server 136 each verify the accuracy of the cell phone numbers in their profiles, the match between this user identifier indicates that the same user 102 is described by the profile data 118 and the profile 137. As a result, the web server 136 can determine that the user identity represented by the user profile 137 is the user corresponding to the request 108 received from the third-party interface 106-A. In other words, the web server 136 can use the match between the verified user identifiers for the two systems to translate from a user identity or user account for the third-party interface 106-A to a user identity or user account for the web server 136.

If, unlike the example of FIG. 1, the web server 136 does not find any match between the trusted identifier 132 and profiles in the profile database 115, the web server 136 will deny authentication and refuse to fulfill the request 108. The web server 136 would indicate the denial of authentication to the NLP service 112, which communicates the denial back to the third-party interface 106-A. In some implementations, the web server 136 can also create a new user based on user identity, or create a temporal user session based on guest user privileges. The guest user privileges can provide for limited access to the certain components within the secure system for a particular period of time. An administrator can set the preferences associated with the temporal user session and the privileges for creating the new user identity. The administrator can include full control over the privileges and restrictions of user access.

During stage (I), in response to finding the match between the trusted identifier 132 and the value in the corresponding field of the profile 137, the web server 136 authenticates the user 102 and establishes one or more sessions for the user 102. When the web server 136 finds a user profile 137 that has a value matching the trusted identifier 132, and the matching value is in the appropriate user profile field, the web server 136 designates the user profile as specifying the user identity for the request 108. In the example, the web server 136 found a match between the trusted identifier 132, which is a value in a cell phone number field, and the value in the cell phone number field in the user profile 137 in the database 115. As a result, the web server 136 authenticates the user identity or user account corresponding to the user profile 137, which is the user 102.

In this process, the web server 136 generally does not require the user 102 to enter any password or credentials by the user 102. The authentication process done by the web server 136 can be done without any input from the user 102, and can be done in a manner that is transparent and undetectable to the user 102. The web server 136 can rely on the authentication status of a user to be able to use the third-party interface 106-A, and then consider the same user sufficiently authenticated to fulfill the request 108. The match between the trusted identifier 132 from the profile data 118 and the profile 137 shows which user identity for the web server 136 corresponds to the user identity authenticated for the third-party interface 106-A. With this match, and the user 102 having been authenticated by the third-party interface 106-A, the web server 136 indicates the same user 102 being authenticated for access to the web server 136 and the application server 138.

In some implementations, the web server may request additional confirmation or verification of the identity of the user 102. For example, having identified the profile 137 for the user 102, the web server 136 may cause the NLP service 112 to request and obtain a code, password, or other verification data from the user 102 through the third-party interface 106-A. As another example, the web server 136 may cause a confirmation request or password challenge to be provided on a mobile phone associated with the user 102 or through another communication channel separate from the third-party interface 106-A. These types of additional verifications of user identity may be reserved for specific situations, such as when answering the request 108 requires accessing a data set with personal data or sensitive data, or which has increased security restrictions. Different levels of verification may be required for access to resources with different levels of access restrictions or security requirements.

The web server 136 may establish a session 140*a* for the communication of information between the web server 136 and the NLP service 112. This session 140*a* may be a hypertext transfer protocol (HTTP) session managed by the application server 138. A second session 140*b* may be established between the web server 136 and the application server 138. This second session 140*b* can be established as the web server 136 opens an application session based on the data in the request 108. For example, the web server 136 can analyze the contents of the request 108 and determine that the request 108 requires information from or processing by the application server 138. For example, the request 108 may include a query, and the web server 136 can determine that the query should be processed by the application server 138, which may be a database server or a search engine. The web server 136 thus requests a session 140*b* with the application server 138, and the web server 136 receives a confirmation when the application server 138 opens the session 140*b*.

During stage (J), once the one or more sessions have been opened (e.g., sessions 140*a* and/or 140*b*), the web server 136 transmits a notification to the NLP service 112. The notification can include session information 142 for session 140*a*, which can be used to send requests to and receive data from the web server 136. The session information 142 can include, for example, a session identifier for the session 140*a*, an authentication token for the session 140*a*, an indication of a duration of the session 140*a*, etc. With the session information 142 for the authenticated and active session 140*a*, the NLP service 112 can issue requests that will be accepted and acted on by the web server 136. The web server 136 can then use the session 140*b* to request and receive information from the application server 138.

For example, with the sessions 140*a*, 140*b* established, the NLP service 112 can re-send the request 108 to the web server 136, this time with an authentication token from the session information 142. In response, the web server 136 will cooperate with the application server 138 to generate response data for the request 108. Because the identity and profile 137 of the user 102 are known to be associated with the sessions 140*a*, 140*b*, the application server 138 can personalize the response data based on preferences of the user 102. For example, the profile 137 of the user 102 can indicate access histories, job role data, query histories, and so on. Thus, the application server 138 can provide response data to the user 102 using preferences associated with the user identity or user profile 137. The response data is provided to the NLP service 112, which forwards it to the third-party interface 106-A for presentation to the user 102.

To facilitate processing of later requests, the NLP service 112 stores the session information 142 for later use. The NLP service 112 also associates the token 110 from the third-party interface 106-A with the session information 142. This can be done by caching the token 110 and storing a mapping 145 between tokens and corresponding session information. Subsequent communications from the third-party interface 106-A that include the same token 110 correspond to the same user 102. As a result, when the NLP service 112 receives a later request from the third-party interface 106-A that includes the token 110, the NLP service 112 can send the request to the web server 136 using a session identifier and authentication token specified by the session information 142. In this situation, the authentication steps performed in stages (C) through (J) are omitted because an authenticated session for the user 102 is already available. The NLP service 112 can use the existing session, as identified using the received token 110 and the token-to-session mapping data 145, to submit the request for processing by the web server 136 and the application server 138.

In some implementations, the functions of the NLP service, the web server 136, and the application server 138 can be combined in a single server or system. For example, these elements may be services of a single server system.

Figure 2:
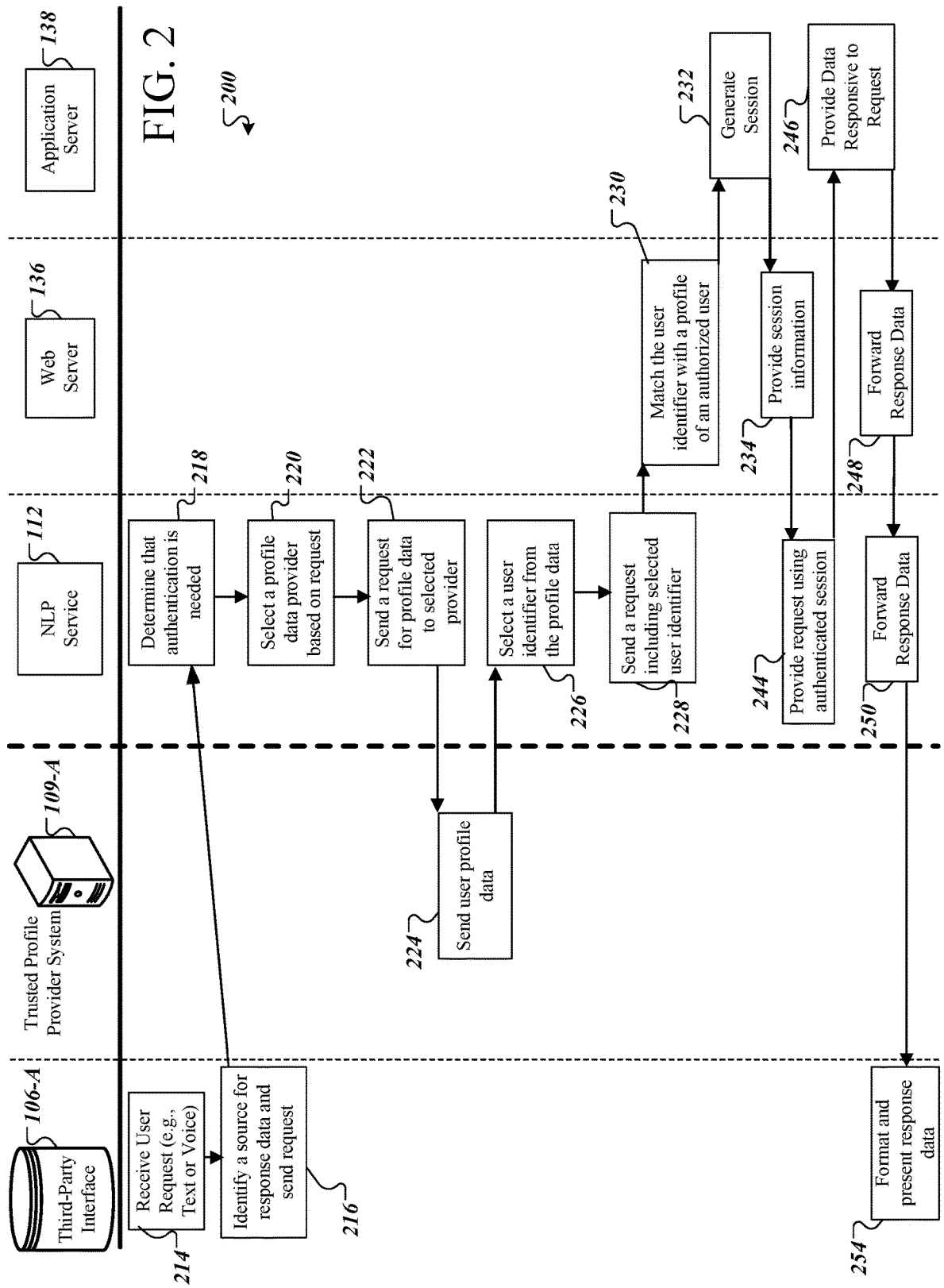
FIG. 2 is a flow diagram that illustrates an example process for authenticating a user at a third-party interface to access a secure system.

FIG. 2 is a flow diagram that illustrates an example process 200 for authenticating a user at a third-party interface for accessing data in a secure system. The process 200 shows various interactions of the elements of FIG. 1 in greater detail.

As discussed above, the NLP service 112, the web server 136, and the application server 138 can be part of a secure system. The NLP service 112 can facilitate and coordinate the processing and authentication of requests from one or more different third-party interfaces.

In order for a user of a third-party interface to access the data from the servers 136, 138 through the third-party interface 106-A, the user is first authenticated. Generally, the user has a profile associated with the third-party interface 106-A and a separate profile associated with the servers 136, 138. During the authentication process, the web server 136 will attempt to link or match data from the user's profile for the third-party interface 106-A to data found in the user's profile for the web server 136. If a matching user identifier is found, e.g., email, cell phone number, etc., then the web server 136 can authenticate the user 102 and establish an authenticated session to allow further communication.

The third-party interface 106-A receives a request from user (214). The request can include a natural language input, such as a voice query, a voice command, a textual query, a textual command, a button press, or other input. The third-party interface 106-A can provided by a client device connected to a network. In some implementations, the third-party interface 106-A can provide the received query to an associated server system for processing (e.g., speech recognition, semantic interpretation, etc.).

The third-party interface 106-A or an associated server system can identify a source of data needed to respond to the user's request (216). The third-party interface 106-A determines that information if needed from the secure system represented by elements 112, 136, and 138. As a result, the request from the user and an associated authentication token 110 are provided to the NLP service 112.

The third-party interface 106-A can determine an intended recipient of the user request. For example, the third-party interface 106-A determines the request is intended for an analytics system represented by the servers 136 and 138. Additionally, the third-party interface 106-A or an associated server can determine from the request that the user is associated with a particular user profile. The user can be authenticated to the third-party interface 106-A so the user profile for the user is known.

Profile data for the users of the third-party interface 106-A is made available through a trusted profile provider system 109-A. A user profile can include a user's username, password, email, cellular number, and/or name, or other user information. The third-party interface 106-A may provide a capability for the user to edit and update the data in the user's profile. Additionally, the third-party interface 106-A can verify the user has correctly logged in to the third-party interface by validating the user's login credentials against data stored in or associated with the user's profile.

The NLP service 112 analyzes the token 110 received in the request and determines that authentication processing is needed (218). In response to analyzing the token 110, the NLP service 112 determines the associated token 110 does not provide authentication for the servers 136 and 138. For example, the NLP service 112 may determine that the associated token is not an authentication token generated by or readable by the web server 136. Similarly, the NLP service 112 may determine that the token 110 is of a type or for a protocol that is not supported by the web server 136. Thus, in order for the NLP service 112 to determine the user associated with the request, the NLP service 112 must take additional steps.

In some implementations, the NLP service 112 selects a trusted profile data provider based on the request (220). For example, the NLP service 112 determines which third-party interface that transmitted the request to the NLP service 112. The NLP service then selects the trusted profile provider system 109-A that corresponds to the third-party interface 106-A that received the user's request.

The NLP service 112 generates a profile data request to transmit to the selected trusted profile provider system 109-A (222). The NLP service 112 generates a profile data request with the received token 110 from the third-party interface 106-A. The token 110 can be used by the trusted profile provider system 109-A to identify a particular user profile corresponding to the user. The NLP service 112 then transmits the profile data request to the trusted profile provider system 109-A.

The trusted profile provider system 109-A receives the profile data request from the NLP service 112 (224). The trusted profile provider system 109-A stores a plurality of profiles, with each profile of an authenticated user being associated with a unique token. Thus, the trusted profile provider system 109-A can retrieve a user profile that is associated with the token 110 in the profile data request. The trusted profile provider system 109-A sends the retrieved user profile data to the NLP service 112 as a response to the profile data request.

The NLP service 112 receives the profile data from the trusted profile provider system 109-A and selects a user identifier from the profile data (226). The NLP service 112 can select a value from a particular, predetermined field from the profile data to use as an identifier for the user. In some implementations, the predetermined field is set for the particular third-party interface 106-A, so that authentication processing for all requests from the same third-party interface 106-A use values from the same predetermined field.

The secure system will use the email field to compare the email from the profile of the user associated with the third-party interface to the email field of the profile associated with the secure system. If a match exists, the user at the third-party interface will be authenticated to transmit subsequent request to the secure system.

The NLP service 112 sends a request that includes the selected user identifier from the profile data from the trusted profile provider system 109-A (228). The request can be generated as a JSON Web Token (JWT) to transmit to the web server 136. The JWT includes the request data from the request provided by the third-party interface 106-A and the selected identifier from the profile retrieved from the trusted profile provider system 109-A. In some implementations, the request is signed or encrypted with a secret key that the NLP service 112 and the web server 136 each have a copy of the secret key.

The web server 136 receives the request (e.g., a signed JWT) from the NLP service 112 and matches the user identifier with a profile of an authorized user of the web server 136 (230). The web server 136 may validate or decrypt the request, if needed, using its stored copy of the secret key. The web server 136 retrieves the user identifier and compares the user identifier to a database that stores user profiles associated with the users for the secure system. For example, the web server 136 compares the email address of the user, e.g., the selected identifier, to an email address in a profile of the user associated with the secure system. If the email addresses match, then the web server 136 deems the user at the third-party interface 106-A to be authenticated for access to data in the secure system (e.g., from servers 136 and 138).

In response to finding the matching profile data, the web server 136 transmits a notification to the application server 138 to cause a session to be created (232). The notification instructs the application server 138 to generate one or more sessions at the application server 138. The sessions at the application server 138 enable the user to access data at the application server in the request and any subsequent request. The application server 138 provides a confirmation to the web server 136 indicating that the one or more sessions have been opened for the particular user. The web server 136 may also establish a session, such as a hypertext transfer protocol (HTTP) session for communication with the NLP service 112 regarding requests of the user.

The web server 136 generates session information representing the sessions opened with the web server 136 and/or application server 138, and provides the session information to the NLP service 112 (234). The session information can include an authentication token that enables the NLP service 112 to transmit requests to the web server 136 and/or application server 138 without having to be authenticated for each request.

With the session information, the NLP service 112 submits the request from the third-party interface 106-A according to the newly opened session (244). For example, the NLP service submits the request with an authentication token that was generated by or otherwise can be validated by the web server 136 and/or the application server 138.

In some server configurations, the NLP service 112 provides the request directly to the application server 138. In other server configurations, the NLP service 112 provides the request to the web server 136, which generates a new request to send to the application server 138.

The application server 138 receives and processes the request sent through an authenticated session, and provides response data (246). For example, the application server 138 can determine the request is seeking financial information, retrieves financial information for the user, and returns the requested financial information. In particular, the application server 138 provides the requested data, e.g., requested financial information, to the web server 136.

The web server 136 receives the requested data from the application server 138 and forwards the requested data to the NLP service 112 (248).

The NLP service 112 receives the requested data and provides the requested data to the third-party interface 106-A (250).

The third-party interface 106-A receives the requested data and presents the requested data to the user (254). For example, the third-party interface 106-A may provide the requested data in audio format, e.g., as synthesized speech, to the user. Alternatively, the third-party interface 106-A may provide the requested data in visual format, such as text on a display of a client device for the user to view. At that point, the user can submit another request to the secure system or cease submitting requests.

Figure 3:
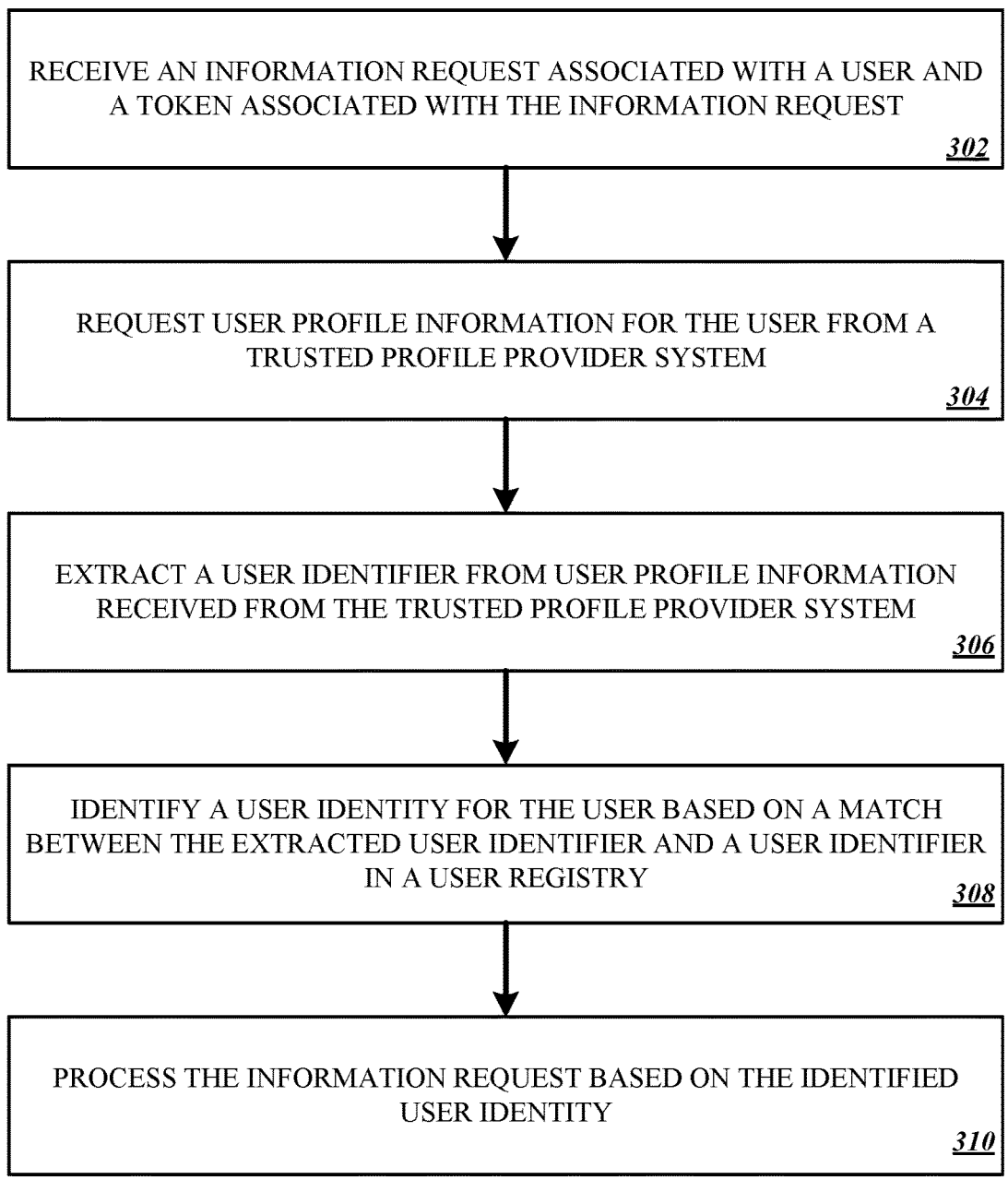
FIG. 3 is a flow diagram of an example process for authenticating a user to access a secure system by matching a user's identity associated with a third-party interface with a user identifier in a secure system.

FIG. 3 is a flow diagram of an example process 300 for authenticating a user to access a secure system by matching a user's identity associated with a third-party interface with a user identifier in a secure system. A computer system, such as a server system, may perform the process 300.

The server system receives (i) an information request to an information system from a computing system that provides a natural language interface, wherein the information request is associated with a user, and (ii) a token corresponding to the information request (302). The information request can include a request for financial data, business data, or personal health related data, to name a few examples. In some implementations, the information request is a query or question that calls for information from a private database, such as a private database of a company, enterprise, or other organization. The information request may be a request for statistics, attributes, metrics, or other categories of data. Some information requests may call for information about the data or relationships specific to the company or role of the user asking the question, and so may need the user's private database or the user's company data to answer appropriately. A few examples include requests that call for responses including attributes from a company's records, "How long has Company X been a customer?," or "Who is the contact with Vendor Y?," or "Navigate to the nearest location of Competitor Y." A few examples that may call for or involve metrics, e.g., calculated quantities based on stored company data, include "What are the three companies with the highest sales last year?," "What is the change in subscribers for the Northeast region from Q2 to Q3?," or "What is the growth rate trend for Department A?"

A user can provide the information request as a voice query, a text query, a voice command, a text command, or in another form. The information request can include data indicating the information needed (e.g., a query) and a token corresponding to the information request. The token can be an authentication token representing the user's authentication to the natural language interface, e.g., a third-party interface with respect to a secure system that is receiving the information request and the token. For example, the token can be a persistent token that demonstrates authentication of the user to the natural language interface and an associated profile provider system. The information request and the token can be generated by the computer system that provides the natural language interface using a request from the user, such as the natural language request 105 shown in FIG. 1. For example, with respect to FIG. 1, a computer system that provides the third-party interface 106-A can generate the request 108 and the token 110 based on the natural language request 105.

In response to receiving the information request, the server system requests user profile information for the user from a trusted profile provider system (304). For example, the server system can send a user data request (e.g., request 116 discussed above) and the token (e.g., token 110 discussed above) associated with the information request to a trusted profile provider system, wherein the user data request requests user profile information for the user associated with the information request. The server system can analyze the received token and determine that the received token is not sufficient to authenticate the user. For example, the server system may determine that the token corresponds to an authentication protocol that a secure web server does not support, or that a key needed to decrypt the token is not available. Similarly, the server system may determine that the secure system does not have reference data needed to verify validity of the token. As a result, the server system transmits a user data request (e.g., request 116) with the token (e.g., token 110) to a trusted profile provider system to retrieve user profile information. Each profile managed by the trusted profile provider system is associated with a particular token. Thus, the trusted profile provider system can retrieve a particular user profile using a particular token.

In generating the user data request, the server system may use information from the information request and profiler provider data to look up the trusted profile provider system that the user data request should be sent from among multiple different trusted profile provider systems. The profile provider data may be stored at the information system or may otherwise be accessible to the information system, and can include mappings between different sources of requests (e.g., different natural language interfaces) and corresponding trusted profile provider systems. As an example, using the content of the information request and the profile provider data, the information system may determine that when a request is received from an ALEXA device, the information system should request profile data from an ALEXA profile data API or server. Similarly, when the information request is from a social networking platform, the information system may identify the trusted profile provider system for the social networking platform as the trusted profile provider system to send the user data request to. The profile provider data may provide information such as API specifications, server addresses, request requirements, and so on to allow the information system to generate the user data requests for any of the trusted profile provider systems. Therefore, the user data request may include, for example, API specifications, server addresses, and/or request requirements, e.g., in addition to information extracted from the information request.

In some implementations, the user data request may optionally include information identifying the user, if received with the information request or is otherwise known. For example, the information identifying the user can include one or more identifiers for the user, such as a name of the user, a username for the user (e.g., social networking username), a user account identifier, an IP address associated with the user (e.g., IP address of a device that was used to generate a natural language request corresponding to the information request), a particular code permanently or temporarily assigned to the user, an identification number for the user, an email for the user, a telephone number for the user, etc. The identifier(s) for the user may be obtained from a user registry that is stored on the information system or is accessible to the information system. Typically, the trusted profile provider system uses the token for the user to identify the appropriate user profile, and in many cases no additional data about the user is needed. Nevertheless, in some implementations user identifiers may be additionally provided to help the trusted profile provider system identify or verify a profile that corresponds to the token.

The user data request may additionally include an indication of specific information that is being requested from the profile of the user in the trusted profile provider system, or an indication that the entire profile for the user is being requested. For example, the user data request may include a request for a full name for the user from the user's profile. The server system may include the request for the user's full name in the user data request because it has an alleged full name for the user, and will compare the retrieved full name of the user to the alleged full name to verify an identity of the user as described in more detail below. Other types of information that may be requested include a user name, account name, account number, email address, telephone number, etc.

For example, the server system provides the user data request and the particular token to the trusted profile provider system. In response, the trusted profile provider system retrieves the user profile that corresponds to the received token. The retrieved profile object includes user profile data of the user, for the user's account with the natural language interface, e.g., a third-party interface. For example, the user profile data of the user related to the third-party interface can include a username, a name, a password, an email address, a telephone number, and a user identifier. The trusted profile provider system provides the retrieved profile object (e.g., text, a numerical value, etc.) to the server system.

The server system extracts a user identifier from user profile information received from the trusted profile provider system (306). The server system extracts the user identifier from the profile object to use for matching to a profile associated with a secure system. The extracted identifier can include a value from a specific, predetermined field in the profile, such as an email address, which is known to be verified as accurate by the natural language interface (e.g., a third-party interface). The extracted identifier may alternatively include, for example, a name (e.g., full name) of the user, a username for the user, a telephone number for the user, the user's driver's license number, the user's passport number, etc. The profile associated with the secure system may be stored in the user profile data that is stored on or is otherwise accessible to the information system. For example, with respect to FIG. 1, the profile provider data 114 may include various user profiles containing, potentially, unverified identifying information for multiple users.

The server system identifies a user identity for the user based on a match between the extracted user identifier and a user identifier in a user registry associated with the information system (308). The server system compares the extracted identifier, e.g., email address, to information in the profile for the user associated with the secure system. For example, the server system may compare an email address extracted from the profile object to an email address stored in the user registry (e.g., the profile provider data 114 shown in FIG. 1). If the server system (e.g., that is part of the information system) determines that a match exists, then the server system opens an authenticated session for the user.

The server system processes the information request based on the identified user identity (310). For example, the server system obtains data in response to the information request and provides it to the natural language interface (e.g., a third-party interface) for presentation to the user. In processing the information request, the server system (e.g., the information system) may provide the requested data in a particular format (e.g., as indicated in the information request). For example, the natural language interface may provide the requested data in audio format, e.g., as synthesized speech, to the user. Alternatively, the natural language interface may provide the requested data in visual format, such as text on a display of a client device for the user to view. At that point, the user can submit another request to the secure system or cease submitting requests.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
receiving, by the one or more computers, (i) an information request to an information system from a computing system that provides a natural language interface, wherein the information request is associated with a user, and (ii) a token associated with the information request, wherein the one or more computers are configured to interface between the information system and multiple different natural language interfaces operated by different third parties and to identify and authenticate users even if the multiple different natural language interfaces do not provide authentication tokens recognized by the information system;
in response to receiving the information request, sending, by the one or more computers, (i) the token associated with the information request and (ii) a user data request for information from a user profile for the user;
extracting, by the one or more computers, a user identifier from user profile information received in response to the user data request;
identifying, by the one or more computers, a user identity for the user based on a match between the extracted user identifier and a user identifier in a user registry associated with the information system; and
processing, by the one or more computers, the information request based on the identified user identity, comprising, in response to identifying the user identity, generating, by the one or more computers, one or more sessions between a web server and the computing system to provide the user access to the web server over the one or more sessions.

2. The method of claim 1, wherein the token associated with the information request corresponds to a first authentication protocol; and
wherein identifying the user identity for the user based on the match between the extracted user identifier and the user identifier in the user registry comprises:
based on the match between the extracted user identifier and the user identifier in the user registry, generating, by the one or more computers, a second token that corresponds to an authentication protocol that is different from the first authentication protocol.

3. The method of claim 1, further comprising:
determining that the token associated with the information request is not of a type used by the information system, wherein the user data request is sent based on determining that the token associated with the information request is not of a type used by the information system.

4. The method of claim 1, wherein the information request is from a system providing a natural language interface, and wherein the information request comprises a natural language query.

5. The method of claim 1, wherein the information request comprises (i) text of a spoken request entered through a voice interface, (ii) text entered from a messaging platform, (iii) text entered using a social networking platform, or (iv) text entered using a chat platform.

6. The method of claim 1, further comprising:
selecting a trusted profile provider system from among multiple trusted profile provider systems based on a source of the information request, wherein the selecting comprises using data indicating a mapping of sources of requests to the multiple trusted profile provider systems to select one of the multiple trusted profile provider systems that corresponds to the source of the information request.

7. The method of claim 1, further comprising:
accessing mapping data indicating a mapping of different types of user identifiers to different trusted profile provider systems; and selecting, based on the mapping data, one of the different types of user identifiers to extract from the user profile information received from the trusted profile provider system.

8. The method of claim 1, wherein a trusted profile provider system is a predetermined provider known to verify an accuracy of at least a user identifier in the user profile information.

9. The method of claim 1, further comprising:
providing, by the one or more computers, responses to the information request from the information system over the one or more sessions, wherein the responses have been personalized based on the identified user identity.

10. The method of claim 1, wherein the information request is provided through an application programming interface (API) provided by a trusted profile provider system.

11. A system comprising:
one or more computers and one or more storage devices storing instructions that are operable, when executed by the one or more computers, to cause the one or more computers to perform operations comprising:
receiving, by the one or more computers, (i) an information request to an information system from a computing system that provides a natural language interface, wherein the information request is associated with a user, and (ii) a token associated with the information request, wherein the one or more computers are configured to interface between the information system and multiple different natural language interfaces operated by different third parties and to identify and authenticate users even if the multiple different natural language interfaces do not provide authentication tokens recognized by the information system;
in response to receiving the information request, sending, by the one or more computers, (i) the token associated with the information request and (ii) a user data request for information from a user profile for the user;
extracting, by the one or more computers, a user identifier from user profile information received in response to the user data request;
identifying, by the one or more computers, a user identity for the user based on a match between the extracted user identifier and a user identifier in a user registry associated with the information system; and
processing, by the one or more computers, the information request based on the identified user identity, comprising, in response to identifying the user identity, generating, by the one or more computers, one or more sessions between a web server and the computing system to provide the user access to the web server over the one or more sessions.

12. The system of claim 11, wherein the token associated with the information request corresponds to a first authentication protocol; and
wherein identifying the user identity for the user based on the match between the extracted user identifier and the user identifier in the user registry comprises:
based on the match between the extracted user identifier and the user identifier in the user registry, generating, by the one or more computers, a second token that corresponds to an authentication protocol that is different from the first authentication protocol.

13. The system of claim 11, wherein the operations further comprise:
determining that the token associated with the information request is not of a type used by the information system, wherein the user data request is sent based on determining that the token associated with the information request is not of a type used by the information system.

14. The system of claim 11, wherein the information request is from a system providing a natural language interface, and wherein the information request comprises a natural language query.

15. The system of claim 11, wherein information request comprises (i) text of a spoken request entered through a voice interface, (ii) text entered from a messaging platform, (iii) text entered using a social networking platform, or (iv) text entered using a chat platform.

16. The system of claim 11, wherein the operations further comprise:
selecting a trusted profile provider system from among multiple trusted profile provider systems based on a source of the information request, wherein the selecting comprises using data indicating a mapping of sources of requests to the multiple trusted profile provider systems to select one of the multiple trusted profile provider systems that corresponds to the source of the information request.

17. The system of claim 11, wherein the operations further comprise:
accessing mapping data indicating a mapping of different types of user identifiers to different trusted profile provider systems; and
selecting, based on the mapping data, one of the different types of user identifiers to extract from the user profile information received from the trusted profile provider system.

18. One or more non-transitory computer-readable media storing software comprising instructions executable by one or more computers which, upon such execution, cause the one or more computers to perform operations comprising:
receiving, by the one or more computers, (i) an information request to an information system from a computing system that provides a natural language interface, wherein the information request is associated with a user, and (ii) a token associated with the information request, wherein the one or more computers are configured to interface between the information system and multiple different natural language interfaces operated by different third parties and to identify and authenticate users even if the multiple different natural language interfaces do not provide authentication tokens recognized by the information system;
in response to receiving the information request, sending, by the one or more computers, (i) the token associated with the information request and (ii) a user data request for information from a user profile for the user;
extracting, by the one or more computers, a user identifier from user profile information received in response to the user data request;
identifying, by the one or more computers, a user identity for the user based on a match between the extracted user identifier and a user identifier in a user registry associated with the information system; and
processing, by the one or more computers, the information request based on the identified user identity, comprising, in response to identifying the user identity, generating, by the one or more computers, one or more sessions between a web server and the computing system to provide the user access to the web server over the one or more sessions.

* * * * *